US009927548B2

(12) United States Patent
Yang et al.

(10) Patent No.: US 9,927,548 B2
(45) Date of Patent: Mar. 27, 2018

(54) APPARATUS FOR WELL LOGGING CAPABLE OF FORWARD INVESTIGATION

(71) Applicants: China Petroleum & Chemical Corporation, Beijing (CN); Shengli Drilling Technology Research Institute of Sinopec, Dongying (CN)

(72) Inventors: Jinzhou Yang, Dongying (CN); Zuohui Li, Dongying (CN); Nan Lin, Dongying (CN); Baojun Wei, Dongying (CN); Qinglong Liu, Dongying (CN); Hongbing Xiao, Dongying (CN)

(73) Assignees: CHINA PETROLEUM & CHEMICAL CORPORATION, Beijing (CN); SHENGLI DRILLING TECHNOLOGY RESEARCH INSTITUTE OF SINOPEC, Dongying (CN)

( * ) Notice: Subject to any disclaimer, the term of this patent is extended or adjusted under 35 U.S.C. 154(b) by 0 days.

(21) Appl. No.: 15/167,490

(22) Filed: May 27, 2016

(65) Prior Publication Data
US 2016/0274265 A1 Sep. 22, 2016

Related U.S. Application Data

(62) Division of application No. 13/996,149, filed as application No. PCT/CN2011/002099 on Dec. 14, 2011, now Pat. No. 9,377,555.

(30) Foreign Application Priority Data

Dec. 23, 2010 (CN) .......................... 2010 1 0601287

(51) Int. Cl.
*G06F 19/00* (2011.01)
*G01V 3/28* (2006.01)
(Continued)

(52) U.S. Cl.
CPC ................. *G01V 3/28* (2013.01); *E21B 7/04* (2013.01); *E21B 49/00* (2013.01); *G01V 3/30* (2013.01)

(58) Field of Classification Search
CPC .......... G01V 3/28; G01V 1/48; E21B 43/006; E21B 43/305
(Continued)

(56) References Cited

U.S. PATENT DOCUMENTS 4,689,572 A 8/1987 Clark
5,508,616 A 4/1996 Sato et al.
(Continued)

FOREIGN PATENT DOCUMENTS

CN 85108416 A 7/1986
CN 1682129 A 10/2005
(Continued)

OTHER PUBLICATIONS

Examination Report Under Section 18(3) for UK Application No. GB1311636.3 dated Mar. 10, 2016, issued by the Intellectual Property Office of the United Kingdom (4 pages).
(Continued)

*Primary Examiner* — Edward Raymond
(74) *Attorney, Agent, or Firm* — Finnegan, Henderson, Farabow, Garrett & Dunner LLP

(57) ABSTRACT

The disclosure relates to an apparatus and a method for well logging as well as a data processing device thereof. Said apparatus for well logging comprises a drill collar body and an array of antennas, wherein said array of antennas comprises at least a pair of transmitting antenna and receiving antenna, said transmitting antenna and receiving antenna are configured for generating a curve of axial forward depth of investigation. By employing the method for well logging according to the present invention, not only the variation of
(Continued)

resistivity in the axial forward formation may be measured in real time during the drilling, but also the interfacial characteristics of the axial forward formations having different resistivity may be discriminated during drilling.

12 Claims, 8 Drawing Sheets

(51) Int. Cl.
    *G01V 3/30*     (2006.01)
    *E21B 7/04*     (2006.01)
    *E21B 49/00*     (2006.01)

(58) Field of Classification Search
    USPC .............................. 702/13, 14, 182–185, 188
    See application file for complete search history.

(56) References Cited

U.S. PATENT DOCUMENTS

| | | |
|---|---|---|
| 6,603,314 B1 | 8/2003 | Kostelnicek et al. |
| 6,791,330 B2 | 9/2004 | McCormick |
| 2002/0101242 A1 | 8/2002 | Bittar |
| 2003/0137301 A1 | 7/2003 | Thompson et al. |
| 2010/0000792 A1 | 1/2010 | Alberty et al. |

FOREIGN PATENT DOCUMENTS

| | | |
|---|---|---|
| CN | 101609169 A | 12/2009 |
| CN | 201387489 Y | 1/2010 |
| EP | 0045243 A2 | 2/1982 |
| GB | 2 388 908 A | 11/2003 |
| JP | 57-033377 A | 2/1982 |
| JP | 58-2688 A | 1/1983 |
| JP | 06-342081 | 12/1994 |
| JP | 2003-504626 A | 2/2003 |
| WO | WO 01/04662 A1 | 1/2001 |
| WO | WO 2007/022116 A1 | 2/2007 |
| WO | WO 2012/023926 A1 | 2/2012 |

OTHER PUBLICATIONS

International Search Report and Written Opinion, issued by International Searching Authority, dated Mar. 22, 2012, in International Application No. PCT/CN2011/002099 (15 pages including English translation of the International Search Report).

Prensky et al., "Recent advances in LWD/MWD and formation evaluation," World Oil, Mar. 2006 Issue, pp. 69-75.

Wei et al., "Evaluating influence of eccentricity on response of electromagnetic wave resistivity logging-while-drilling by vector elgenfunction expansion formulae for dyadic Green's functions," Journal of China University of Petroleum, vol. 34, No. 5, Oct. 2010, pp. 57-62.

Yang et al., "Basic theory of electromagnetic wave resistivity measurement while drilling tool with tilted antennas and its application for geo-steering," Journal of China University of Petroleum, vol. 33, No. 1, pp. 44-49, Feb. 2009.

Combined Search and Examination Report issued from the Intellectual Property Office of the United Kingdom, in Application No. GB1612390.3, dated Jul. 25, 2016.

Office Action dated Jan. 30, 2017, received from Canadian Intellectual Property Office in Canadian application No. 2,822,506 (4 pages).

| formation resistivity (Ωm) | 0.1 | 0.2 | 1 | 10 | 20 | 50 | 100 | 200 | 2000 |
|---|---|---|---|---|---|---|---|---|---|
| phase difference (degree) | 75.9 | 52.7 | 21.2 | 4.26 | 2.42 | 1.09 | 5.78E-01 | 3.02E-01 | 3.26E-02 |
| amplitude ratio (decibel) | 9.32 | 6.00 | 1.85 | 0.20 | 8.59E-02 | 2.69E-02 | 1.07E-02 | 4.18E-03 | 1.94E-04 |

Fig.9

| formation resistivity (Ωm) | 0.1 | 0.2 | 1 | 10 | 20 | 50 | 100 | 200 | 2000 |
|---|---|---|---|---|---|---|---|---|---|
| phase difference (degree) | 31.8 | 21.2 | 7.23 | 1.09 | 5.77E-01 | 2.43E-01 | 1.25E-01 | 6.37E-02 | 6.57E-03 |
| amplitude ratio (decibel) | 3.17 | 1.85 | 0.41 | 2.66E-02 | 9.23E-03 | 2.94E-03 | 1.10E-03 | 4.02E-04 | 1.55E-05 |

Fig.10

| formation resistivity (Ωm) | 0.1 | 0.2 | 1 | 10 | 20 | 50 | 100 | 200 | 2000 |
|---|---|---|---|---|---|---|---|---|---|
| phase difference (degree) | 77.0 | 54.1 | 23.2 | 5.73 | 3.49 | 1.70 | 9.45E-01 | 5.11E-01 | 5.89E-02 |
| amplitude ratio (decibel) | 10.37 | 6.96 | 2.51 | 0.385 | 0.190 | 6.80E-02 | 2.93E-02 | 1.21E-02 | 6.28E-04 |

Fig.11

| formation resistivity (Ωm) | 0.1 | 0.2 | 1 | 10 | 20 | 50 | 100 | 200 | 2000 |
|---|---|---|---|---|---|---|---|---|---|
| phase difference (degree) | 33.6 | 23.2 | 9.05 | 1.70 | 9.43E-01 | 4.16E-01 | 2.18E-01 | 1.13E-01 | 1.20E-02 |
| amplitude ratio (decibel) | 3.97 | 2.51 | 0.724 | 6.71E-02 | 2.86E-02 | 8.62E-03 | 3.34E-03 | 1.26E-03 | 4.68E-05 |

Fig.12

APPARATUS FOR WELL LOGGING CAPABLE OF FORWARD INVESTIGATION

CROSS-REFERENCE TO RELATED APPLICATIONS

This is a division of application Ser. No. 13/996,149 with a § 371(c) date of Sep. 3, 2013, which is a national phase application of International Application No. PCT/CN2011/002099 filed Dec. 14, 2011, which claims the benefit of Chinese Application No. 201010601287.5 filed Dec. 23, 2010, the entire contents of all of which are incorporated herein by reference.

TECHNICAL FIELD

The invention relates to the technical field of well logging, more specifically, the invention relates to the technical field of measurement while drilling (i.e. MWD) in the drilling industry. In particular, the invention relates to an apparatus and method for well logging as well as a data processing device thereof.

BACKGROUND OF THE INVENTION

At present, in the art of MWD in the drilling industry such as the explorating of oil and gas, coalbed methane, shale gas trapped within shale formations, drilling, mining and so on, the formation resistivity is generally used to form stratigraphic profiles and to determine oil saturation, gas content from coal structure and mineral fractures of reservoirs, thus the formation resistivity is a primary basis for explaining and evaluating oil and gas, coal, mineral reserves in well logging. The currently known logging-while-drilling (LWD) resistivity logging technique includes LWD lateral resistivity logging, LWD electromagnetic wave propagation resistivity logging and LWD induction resistivity logging.

The principle of the LWD lateral resistivity logging primarily involves providing current by power supply electrodes, forming an electrical field in formations around a borehole, measuring the distribution of the electrical field in the formations and obtaining the formation resistivity. An apparatus for LWD lateral resistivity logging makes the drill bit as an electrode, and also may employ a loop electrode and three button electrodes approximate the drill bit to take resistivity measurement. In the case where a drill bit serves as an electrode, before mud invasion or possible damage to the borehole, the apparatus for LWD lateral resistivity logging may measure the resistivity of a thin layer of 5-10 cm. While if a three-button electrode array is employed, a high-resolution lateral resistivity measurement may be achieved, which may reduce influence of surrounding rocks, and may provide a true formation resistivity response even in brine mud or formations having a high resistivity. Besides, if a loop electrode is employed, the resistivity information within a 360° range around the borehole may be obtained.

However, the above-mentioned apparatus for LWD lateral resistivity logging has deficiencies as follows: since the technique of lateral resistivity logging belongs to the method of DC electrical logging, that is to say, it needs to have a power supply electrode to conduct DC current into a formation, and then use a measuring electrode to measure the electrical potential at certain point in the well, thus such lateral resistivity logging method may be used only when there is conductive mud in the well that provides current channels. However, during the practical drilling operation such as the oil drilling operation, sometimes, in order to obtain the information of original oil saturation in a formation, it needs to employ oil-based mud drilling, or even employ air drilling. In such cases, the DC electrical logging method cannot be used, that is, the method of LWD lateral resistivity logging is no longer applicable in said cases.

An apparatus for LWD electromagnetic wave propagation resistivity logging employs multi-coil system, the propagation frequency is 1-8 MHz, the coil system is based on the body structure of the drill collar, and the coil system is wound around the drill collar. A phase shift shallow resistivity and an attenuation deep resistivity are calculated through measuring the amplitude ratio or phase difference between different transmitting coil and receiving coil and thereafter converting the amplitude ratio or phase difference to apparent resistivity of the formation. In ideal cases, the axial resolution of the apparatus for LWD electromagnetic wave propagation resistivity logging is dependent on the interval between two receiving coils, and the measurement data at multiple depths of investigation may be used to explain the status of mud invasion. Normally, those skilled in the art will appreciate that the depth of investigation of the phase resistivity is less, while the depth of investigation of the attenuation resistivity is deeper.

A Chinese patent application publication No. CN101609169A titled "Method for improving the precision of electromagnetic wave resistivity measurement and expanding measurement range thereof" discloses that the mutual induction electromotive force which are not related to the resistivity of formation, zero signals of a circuit and base signals of an antenna system in a plot of amplitude attenuation-resistivity conversion and a plot of phase difference-resistivity conversion of the mutual induction electromotive force is eliminated by calculating the mutual induction electromotive force between a transmitting antenna and a receiving antenna, and the conversion of phase difference and amplitude attenuation to the resistivity of formation may be obtained.

Besides, the reference document titled "Basic theory of an apparatus of electromagnetic wave resistivity LWD with tilted antennas and the application for geo-steering thereof" published in Journal of China University of Petroleum calculates the response of the apparatus of electromagnetic wave resistivity LWD with tilted antennas by using a recursive matrix method for computation of the Green's function of magnetic dipole source in anisotropic horizontally stratified medium, analyzes the influence of the relative inclination of the borehole and the dip angle of the receiving coil upon the amplitude ratio and phase difference of the receiving signal, as well as the characteristics of the conventional tools and novel tools of making response to the curve horn in the direction perpendicular to the axis of the tool, whereby predicting the existence of a formation boundary earlier.

However, although the various apparatuses for LWD electromagnetic wave propagation resistivity logging at present may measure resistivity at different depths of investigation, they have deficiencies as follows.

Firstly, the signal frequency used by the apparatus for LWD electromagnetic wave propagation resistivity logging is too high, the depth of investigation is limited due to the propagation effect of the electromagnetic wave.

Secondly, the measurement result of the apparatus for LWD electromagnetic wave propagation resistivity logging will be influenced by geological factors, especially influenced by surrounding rocks, because the measurement result of the apparatus is not only limited to the formation area between receiving coils, but also related to parameters of the whole formation between the transmitting coils and receiving coils, and even the formation within a relatively small area around the transmitting coil will influence the measurement result. Therefore, the axial resolution of the apparatus for well logging depends largely on the resistivity of the formation in which the whole apparatus is located.

Thirdly, since the coil system of the apparatus for LWD electromagnetic wave propagation resistivity logging is wound on the surface of the drill collar, the manufacture process thereof is rather complicated. Moreover, the coil system may be easily abraded and thus be damaged during operating. Then, when the size of the borehole varies, it needs to rewind the coils, thus the maintenance and overhaul is rather complicated and the maintenance cost is high. Besides, similar to the apparatus for LWD lateral resistivity logging, the apparatus for LWD electromagnetic wave propagation resistivity logging is unable to work in oil-based mud.

An apparatus for LWD induction resistivity logging applies the principle of electromagnetic induction. When alternating current at constant amplitude and frequency is applied in a transmitting coil, eddy current is induced in the formation surrounding said coil, and the eddy current per se will form a secondary alternating electromagnetic field. Under the effect of the secondary alternating electromagnetic field, induced electromotive force will be generated in receiving coils. The amount of said electromotive force is associated with the conductivity of formation, and the resistivity of formation may be obtained through measuring the induced electromotive force.

The coil system of the apparatus for LWD induction resistivity logging at present employs one transmitting coil and two receiving coils, and one of said two receiving coils is the primary receiving coil while the other one is the compensatory coil. The coil system is positioned in a V-shaped groove with a reflection layer on a lateral face of the drill collar. The response of well logging is sensitive to the resistivity variation of the formation in the front area of the V-shaped groove, thus it has the characteristic of directional measurement. The apparatus for LWD induction resistivity logging is supplied with power by a battery. On the top of the battery, there is provided with a male buckle joint which may be joined to a female buckle joint on the bottom of the apparatus for LWD induction resistivity logging for transferring real-time data from the apparatus for LWD induction resistivity logging to the surface. The same survey sub may be adapted to the requirements of boreholes in different sizes.

The advantages of such an apparatus for LWD induction resistivity logging are as follows. Since the signal frequency thereof is 20 kHz, which is greatly lower than the frequency of a high-frequency apparatus, it is not easily absorbed by formations. Furthermore, the depth of investigation is deep and the range of measurement is relatively large, which may reach 0.1-1000 Ωm. Moreover, the structure of such an apparatus is simple, and one survey sub may be adapted to the requirements of boreholes in different sizes. Also, the maintenance and overhaul is relatively easy, and it is adapted to different drilling fluids.

However, such an apparatus for LWD induction resistivity logging further has deficiencies as follows. Since the apparatus employs a coil system composed of one transmitting coil and two receiving coils and having a single fixed depth of investigation, said apparatus may only provide the resistivity of formation in one radial depth of investigation, while cannot be used to explain complicated invasive profile and to separate the corrosive formations. Besides, as for a corrosive formation, mud invasion causes the resistivity thereof to vary in radial directions, since only a resistivity value in one radial depth of investigation can be obtained at a measurement point in the same depth, the apparatus for LWD induction resistivity logging cannot be used to explain the invasion condition of the formation, and the condition where the formation is invaded by mud and the reservoir permeability cannot be determined. This is disadvantageous for explanation of oil and gas reservoirs, thus it cannot be used to calculate the true formation resistivity accurately. Furthermore, as for different types of mud invasion and the resistivity in different radial depths of investigation, the characteristics of the oil-gas-water layers are different. The oil and gas may be identified according to different degrees of mud invasion influences upon multiple resistivity curves at different depths of investigation, as well as differential characteristics manifested by the oil-gas-water layers. Therefore, multi-depth resistivity measurement is significant to a LWD apparatus. However, the apparatus for LWD induction resistivity logging at present is unable to meet the requirement. Furthermore, since the designed structure for the coil system of said apparatus is fixed, each coil system may only measure the resistivity at one depth, and different coil systems have to be used to take multiple measurements in order to obtain resistivity at different depths of investigation. As a result, it is hard to carry out such a LWD induction resistivity logging manner during the practical application.

In summary, no matter which one of said LWD resistivity apparatuses is concerned, it has many deficiencies. Moreover, each of said LWD resistivity apparatuses is only dedicated to measure and calculate the radial depth of investigation, while does not mention or refer to the measurement of axial-forward depth of investigation. However, as the number of the transmitting antennas and receiving antennas of various apparatuses for LWD resistivity logging increases continuously, the transmitting frequency decreases. Therefore, the axial depth investigation becomes growingly important to the drill engineering. Consequently, the need for the method of LWD axial-forward investigation is growingly increased in the art of well drilling and logging.

SUMMARY OF THE INVENTION

In order to overcome the aforesaid one or more deficiencies existing in the prior techniques of LWD resistivity logging, the invention provides a new method for logging while drilling, which may not only measure in real time the variation of resistivity in the axial forward formation during drilling, but also discriminate the interfacial characteristics of the axial forward formations having different resistivity during drilling.

According to one respect of the invention, a method for well logging is provided, comprising:

(a) a step of selecting homogeneous measurement point, wherein an apparatus for well logging is configured to select two sequential measurement points to take at least two sequential measurements;

(b) determining whether said selected two sequential measurement points may serve as selectable points of homogeneous formation according to the measurement results at said two sequential measurement points, if yes, then proceeds to the following step (c);

(c) deriving the amplitude ratio essential value and phase difference essential value of the signal response generated by the apparatus for well logging, which corresponds to the formation resistivity of the measured high-resistivity target formation, from said two selectable points of homogeneous formation;

(d) deriving the amplitude ratio standard value and phase difference standard value corresponding to the formation resistivity of the measured target formation from said amplitude ratio essential value and phase difference essential value;

(e) setting a layer-out threshold of the formation for said measured high-resistivity target formation according to said amplitude ratio standard value and phase difference standard value.

(f) selecting a next measurement point to take at least two measurements at said next measurement point;

(g) deciding whether the amount of variation in amplitude ratio and/or the amount of variation in phase difference of the induced electromotive force between a pair of receiving antennas of the apparatus for well logging at the current measurement point are greater than said layer-out threshold; if yes, then proceed to the following step (h);

(h) it is determined that a formation with low-resistivity appears in front of the apparatus for well logging.

According to another respect of the invention, a data processing device is provided, wherein said data processing device comprises:

means for determining selectable points of homogeneous formation, which is configured to determine whether both of the two sequential measurement points currently selected by an apparatus for well logging may serve as selectable points of homogeneous formation or not;

means for deriving essential values, which is configured to derive the amplitude ratio essential value and phase difference essential value of the signal response generated by the apparatus for well logging according to said two selectable points of homogeneous formation when it is determined by said means for determining selectable point of homogeneous formation that the two sequential measurement points may serve as selectable points of homogeneous formation; wherein the amplitude ratio essential value and phase difference essential value correspond to the formation resistivity of the measured high-resistivity target formation;

means for deriving standard values, which is configured to derive the amplitude ratio standard value and phase difference standard value corresponding to the formation resistivity of the measured high-resistivity target formation from said amplitude ratio essential value and phase difference essential value, means for setting layer-out threshold, which is configured to set a layer-out threshold of the formation for said measured high-resistivity target formation according to said amplitude ratio standard value and phase difference standard value;

means for selecting the third through the $n^{th}$ measurement points and calculating the amount of variation in amplitude ratio and phase difference, which is configured to select a next measurement point to take at least two measurements at said next measurement point, and calculate the amount of variation in amplitude ratio and the amount of variation in phase difference of the induced electromotive force between a pair of receiving antennas of the apparatus for well logging at the current selected measurement point; and means for determining the presence of the formation with low-resistivity, which comprises a unit for determining the occurrence of layer-out, said unit is configured to decide whether the amount of variation in amplitude ratio and/or the amount of variation in phase difference at the current selected measurement point are greater than said layer-out threshold; if yes, it is determined that a formation with low-resistivity appears in front of the apparatus for well logging.

According to a yet another aspect of the invention, an apparatus for well logging is provided, wherein said apparatus for well logging comprises a drill collar body and an array of antennas, wherein said array of antennas comprises at least a pair of transmitting antenna and receiving antenna, said transmitting antenna and receiving antenna are configured for generating a curve of axial forward depth of investigation.

Compared to the radial-depth investigation, the axial-depth investigation according to the invention possesses the following advantages.

First of all, the axial-depth investigation according to the invention may effectively control the trajectory of the inclination-made section in drill engineering. The well known measurement of horizontal segment of formation usually assumes a horizontal layered distribution, when deflection begins, the apparatus for resistivity logging is almost perpendicular to the horizontal layered formations. Therefore, the response of radial investigation can only reflect the variation in resistivity of the measured formation at certain layer, while the response of axial investigation has a plurality of axial layers of investigation, which may reflect the variation in resistivity of the measured formation at multiple different drilling depths, effectively identify formation boundary and oil-water contact, and adjust the deflection radian to make it accurate and smooth, thus improve the drilling quality in the inclination section.

Further, when the drilling bit enters a complicated highly-deviated well or horizontal section, the axial-depth investigation according to the invention may perform axial investigation at different depths on the formations along the direction of drilling movement. Therefore, it is more direct and accurate as compared to the method of radial investigation, and it can predetermine a thin reservoir, a complicated folded and interlaid bed, whereby effectively keeping away from faults, drilling to a long distance along high-dip reservoirs and obtaining a highest effective drilling catching rate for oil and gas.

The method for well logging according to the invention and the corresponding data processing apparatus may measure in real time the variation characteristics of the variation ratio of the formation resistivity in the drilling process, discriminate in real time the formation boundary and oil-water interface, and capture the best opportunity of entering the oil and gas reservoir. Moreover, the method may predict the geological information in front of the drill bit much earlier, adjust the trajectory of the borehole timely in high-dip and anisotropic-formation horizontal wells, and control the drill tool to pass through the best location of the petroleum reservoir so as to obtain the largest oil contact face. Therefore, it is extremely adaptive to geo-steering in petroleum engineering.

BRIEF DESCRIPTION OF THE FIGURES

FIG. 9 shows a reference table for eigenvalues of the resistivity, the amplitude ratio and the phase difference of various types of formations generated by the antenna system T2-R1-R2 of an apparatus for well logging according to a preferred embodiment of the invention at the frequency of 2 MHz.

FIG. 10 shows a reference table for eigenvalues of the resistivity, the amplitude ratio and the phase difference of various types of formations generated by the antenna system T2-R1-R2 of an apparatus for well logging according to a preferred embodiment of the invention at the frequency of 400 kHz.

FIG. 11 shows a reference table for eigenvalues of the resistivity, the amplitude ratio and the phase difference of various types of formations generated by the antenna system T1-R1-R2 of an apparatus for well logging according to a preferred embodiment of the invention at the frequency of 2 MHz.

FIG. 12 shows a reference table for eigenvalues of the resistivity, the amplitude ratio and the phase difference of various types of formations generated by the antenna system T1-R1-R2 of an apparatus for well logging according to a preferred embodiment of the invention at the frequency of 400 kHz.

DETAILED DESCRIPTION OF THE INVENTION

Some terms are used for denoting specific system components throughout the application document. As would be appreciated by those skilled in the art, different designations may usually be used for denoting the same component, thus the application document does not intend to distinguish those components that are only different in name rather than in function. In the application document, terms "comprise", "include" and "have" are used in the opening way, and thus they shall be construed as meaning "comprise but not limited to . . . ". Besides, Terms "substantially", "essentially", or "approximately", that may be used herein, relate to an industry-accepted tolerance to the corresponding term. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

In the following description, for the purpose of explanation, many specific details are set forth so as to provide a thorough understanding of the invention. However, it is apparent for those skilled in the art that the apparatus, method and device of the present invention may be implemented without those specific details. The reference to the "embodiment", "example" or similar language in the Description means that the specific features, structures or characteristics described in connection with the embodiment or example are comprised in at least said embodiment or example, but are not necessarily comprised in other embodiments or examples. Various instances of the phrases of "in an embodiment", "in a preferred embodiment" or similar phrase in different portions of the Description do not necessarily all refer to the same embodiment.

The present invention is further illustrated in connection with preferred embodiments and corresponding figures below.

Figure 1:
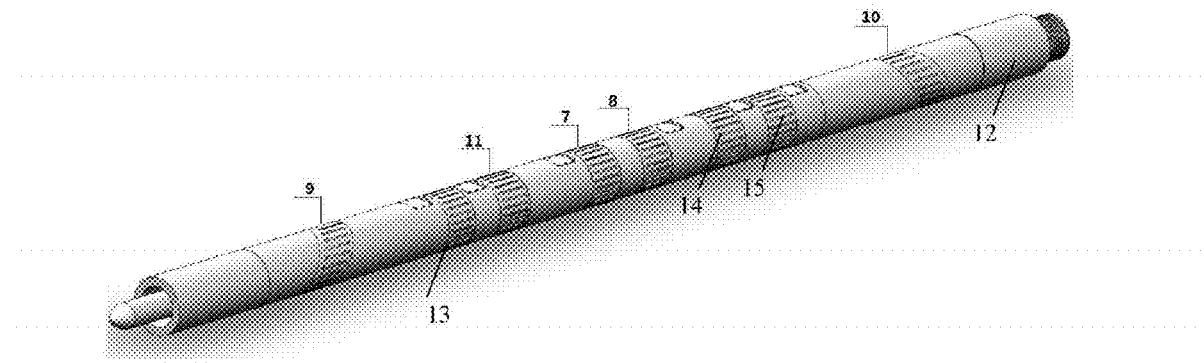
FIG. 1 shows an apparatus for well logging according to a preferred embodiment of the invention.

FIG. 1 shows an apparatus for well logging according to a preferred embodiment of the invention. In such a preferred embodiment, the apparatus for well logging is an apparatus for electromagnetic wave propagation resistivity logging which comprises a drill collar body 12, an array of antennas 7-11, 13-15, an internal electronic circuit (not shown in the figure) and a solidifying sealing member for coupling each component.

As shown in FIG. 1, the drill collar body 12 is preferably made of a cylindrical stainless steel material with an axial via hole therein in the embodiment. A plurality of grooves that are preferably circle-shaped or ellipse-shaped are carved on the exterior surface of the drill collar body 12, and said grooves are used for installation of the transmitting antenna(s) or receiving antenna(s).

In the preferred embodiment shown in FIG. 1, the array of antenna comprises four transmitting antennas T1 (as shown by reference number 11), T2 (as shown by reference number 14), T3 (as shown by reference number 13) and T4 (as shown by reference number 15), and four receiving antennas R1 (as shown by reference number 7), R2 (as shown by reference number 8), R3 (as shown by reference number 9) and R4 (as shown by reference number 10).

As shown in FIG. 1, the transmitting antennas and the receiving antennas are installed from the left side of FIG. 1 to the right side (i.e. from the drill-collar-tail to the drill-head of the drill collar body 12) preferably according to the sequence of the receiving antenna R3, the transmitting antenna T3, the transmitting antenna T1, the receiving antenna R1, the receiving antenna R2, the transmitting antenna T2, the transmitting antenna T4, and the receiving antenna R4.

In the preferred embodiment, the middle point between the receiving antennas R1 and R2 is the measurement point, and the transmitting antennas T1, T2, T3 and T4 are preferably installed symmetrically about said measurement point. The receiving antennas R1 and R2 preferably are a pair of receiving antennas having a installation angle of 0°, and the receiving antennas R3 and R4 are another pair of receiving antennas symmetrical about said measurement point, as shown in FIG. 1. The receiving antennas R3 and R4 are preferably positioned on the two ends of the drill collar. The installation angles of the receiving antennas R3 and R4 may be set in any appropriate manner, and they are preferably (but not limited to be) set to 45° and −45° in the preferred embodiment.

With respect to any one of the transmitting antennas and any pair of receiving antennas (e.g. transmitting antenna T1, receiving antennas R1 and R2), electromagnetic signals propagate via the surrounding formation and the drill collar body when the transmitting antenna is excited. The electromagnetic signals are reflected and transmitted by the formation, and produce electromagnetic induction signals on the receiving antennas. The electromagnetic induction signals are collected by the receiving antennas, amplified and filtered by the internal electronic circuit, and finally transformed to the function of the resistivity of the formation through which they propagates.

In the case of the apparatus for well logging (e.g. the apparatus for electromagnetic wave propagation resistivity logging) being operated down hole, if the electrical parameter of the formation (e.g. the resistivity contrast of the formations) in front of said apparatus is substantially constant, it indicates that no formation boundary appears. At this time, the electromagnetic signal reflected onto the receiving antennas is substantially constant. On the contrary, if the electrical parameter of the formation in front of said apparatus varies, it indicates that a formation boundary appears. At this time, the electromagnetic signal reflecting onto the receiving antennas varies, thus a signal difference is generated. The distance of the axial forward investigation may be obtained by continuously collecting and calculating the signal difference.

Any combination of any one of the transmitting antennas with any pair of receiving antennas in the apparatus for well logging according to the invention may generate a curve of axial forward investigation. By comparing and processing all of the curves of axial forward investigation, environmental influence (e.g. influence of the borehole) and measurement error may be eliminated, whereby the axial forward investigation accuracy of the apparatus for well logging may be improved.

Next, a preferred method for logging while drilling according to another embodiment of the invention will be described in detail in connection with the figures.

Figure 13:
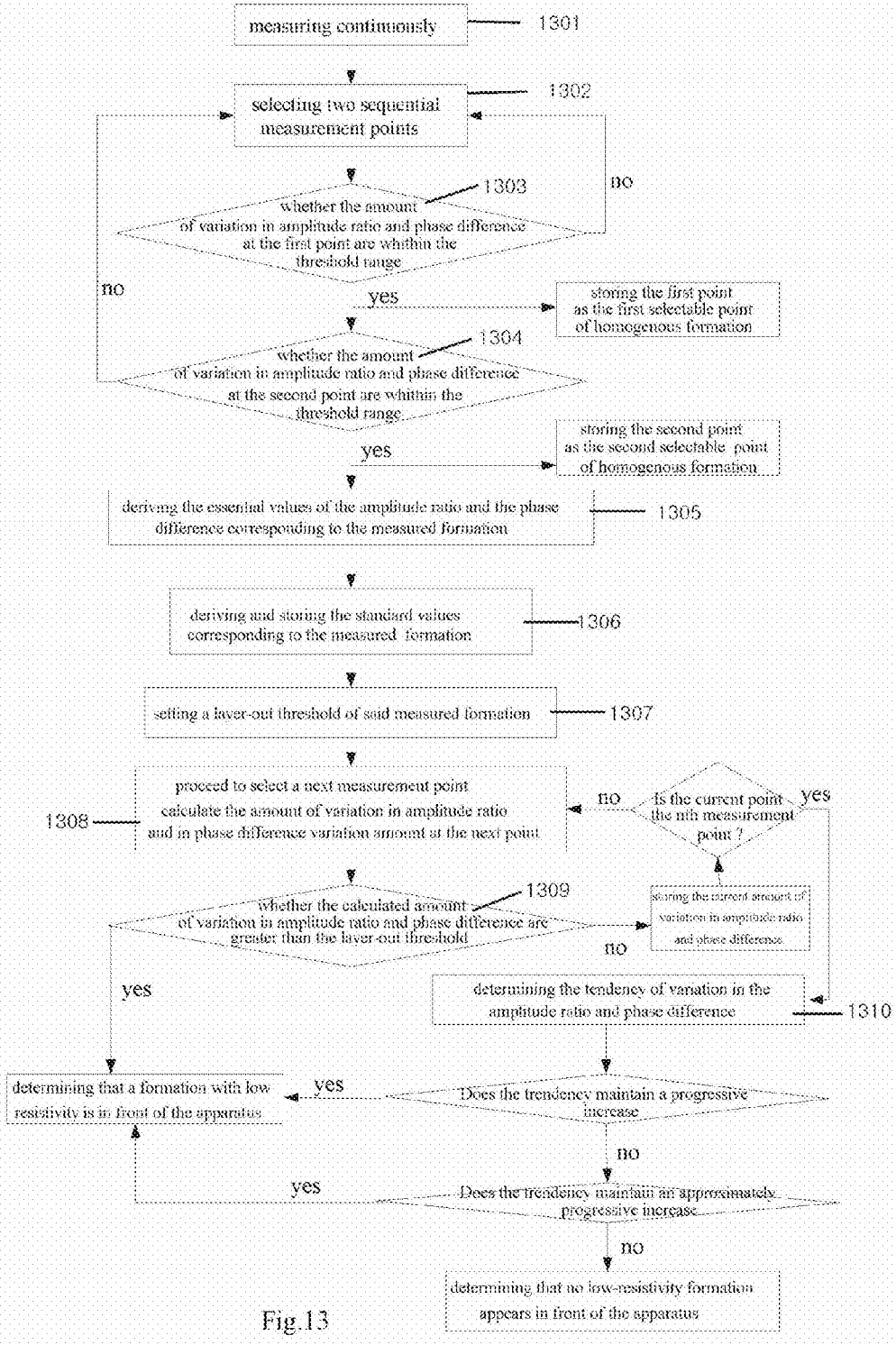
FIG. 13 shows a flowchart of a method for logging while drilling according to a preferred embodiment of the invention.

As shown in FIG. 13, a method for logging while drilling according to a preferred embodiment of the invention, e.g. a method for electromagnetic wave propagation resistivity axial forward logging, comprises steps as follows.

In step 1301, an apparatus for logging while drilling (e.g. the apparatus for electromagnetic wave propagation resistivity axial forward logging as shown in FIG. 1) are placed into a target formation with high-resistivity at a certain depth. The apparatus for well logging take measurements continually during drilling, and the direction of the investigation is consistent with the direction of the axial movement of said apparatus for well logging.

In step 1302, two sequential measurement points (e.g. the first measurement point and the second measurement point) are selected, and at least two sequential measurements are took at each measurement point.

In step 1303, if it can be determined from the at least two sequential measurements at the first measurement point that, the amount of variation in amplitude ratio $\Delta$Att and the amount of variation in phase difference $\Delta$PSD of the induced electromotive force between the first receiving antenna and the second receiving antenna along the axial direction of the apparatus for well logging are within their respective preset threshold range, the first measurement point is stored as the first selectable point of homogeneous formation. For example, the preset threshold range for the amount of variation in amplitude ratio may be 0-0.03 dB or other appropriate preset range, and the preset threshold range for the amount of variation in phase difference may be 0°-0.1° or other appropriate preset range.

In step 1304, if it can be determined from the at least two sequential measurements at the second measurement point that, the amount of variation in amplitude ratio $\Delta$Att and the amount of variation in phase difference $\Delta$PSD of the induced electromotive force between the first receiving antenna and the second receiving antenna along the axial direction of the apparatus for well logging are within their respective preset threshold range, the second measurement point is stored as the second selectable point of homogeneous formation.

If it is determined in steps 1303 and 1304 that any one or both of the first and second measurement points do not meet the aforesaid requirements, then returning to step 1302 to continue to take further measurements while drilling and select another two sequential measurement points, until both of the two currently-selected measurement points meet the aforesaid requirements.

After the first and second selectable points of homogenous formation are determined via steps 1303 and 1304, in step 1305, the average value or mean square root of the multiple measurements of amplitude ratio of the induced electromotive force between the first receiving antenna and the second receiving antenna measured at both of the first and second selectable points of homogeneous formation is considered as the amplitude ratio essential value Att0 of the signal response generated by the apparatus for well logging, which corresponds to the formation resistivity of the measured target formation. In a similar way, the average value or mean square root of the multiple measurements of the phase difference measured at both of the first and second selectable points of homogeneous formation is considered as the phase difference essential value PSD0 corresponding to the formation resistivity of the measured target formation.

Next, in step 1306, deriving and storing the standard value corresponding to the formation resistivity of the measured target formation. In particular, said amplitude ratio essential value Att0 and phase difference essential value PSD0 of the measured high-resistivity target formation are compared with the corresponding predetermined eigenvalues of various types of formations, then the eigenvalues of the type of formation closest to said amplitude ratio essential value Att0 and phase difference essential value PSD0 can be selected as the amplitude ratio standard value and phase difference standard value corresponding to the formation resistivity of the measured high-resistivity target formation. The amplitude ratio standard value and phase difference standard value are stored in a memory.

Optionally, in step 1307, a layer-out threshold of said measured high-resistivity target formation is set according to the amplitude ratio standard value and phase difference standard value corresponding to the formation resistivity of the measured high-resistivity target formation. Specifically, when the apparatus for well logging approaches a formation boundary with low-resistivity, the amplitude ratio and phase difference of the induced electromotive force between the first receiving antenna and the second receiving antenna in the axial direction of said apparatus for well logging will vary. The closer the apparatus for well logging approaches the boundary with low-resistivity, the greater the amount of variation in said actually measured amplitude ratio and phase difference with respect to the amplitude ratio standard value and the phase difference standard value are. When the amount of variation in the amplitude ratio and phase difference reaches or exceeds a preset value, it is normally deemed that a formation with low-resistivity appears in front of the apparatus for well logging. Said preset value is named as the layer-out threshold herein.

It is noted that the layer-out threshold for different measured formations may be set to different preset values by those skilled in the art according to the characteristics of the actually measured formations and measurement conditions. Generally, the layer-out threshold may be derived from the resistivity contrast between the two formations of the currently measured formation and the axial forward formation. Preferably, no matter how the resistivity contrast between the two formations of the currently measured formation and the axial forward formation is like, the layer-out threshold may be set to be 1%-30% of the amplitude ratio standard value or phase difference standard value. Further preferably, when said resistivity contrast is 1/10, the layer-out threshold may be preferably set to be 10% of said amplitude ratio standard value or phase difference standard value. The aforementioned manner of determining the layer-out threshold and the specific value of the layer-out threshold are for illustrative purpose only rather than for restrictive purpose, and those skilled in the art may select appropriate values in other ways according to practice.

As shown in FIG. 13, in step 1308, proceeding to select a next measurement point, take at least two measurements at the next measurement point, and calculate the amount of variation in amplitude ratio ΔAtt and the amount of variation in phase difference ΔPSD of the induced electromotive force between the first receiving antenna and the second receiving antenna along the axial direction of the apparatus for well logging at such a measurement point.

In step 1309, determining whether the amount of variation in amplitude ratio ΔAtt and the amount of variation in phase difference ΔPSD calculated in step 1308 are greater than the layer-out threshold. If yes, it is determined that a formation with low-resistivity appears in front of said apparatus for well logging. If not, storing the current amount of variation in amplitude ratio ΔAtt and the amount of variation in phase difference ΔPSD, and then determining whether the currently selected measurement point is the preset nth measurement point, if not, returning to step 1308 and proceeding to select a next measurement point as well as performing the calculation of the amount of variation in amplitude ratio ΔAtt and the amount of variation in phase difference ΔPSD; or else if the currently selected measurement point is the preset nth measurement point, then moving to step 1310.

Please note that said number 'n' is preset by those skilled in the art based on the characteristics of the measured formation and the measuring speed. For example, if the measured formation is a softer formation (e.g. sand rocks in a coastal area), n can be smaller, while if the measured formation is a harder formation (e.g. shale rocks), n can be larger. Typically, for a general formation, n may be preferably preset to be 20-30, but the invention never to be limited to such a range of value, and other appropriate values may be preset for n.

In step 1310, the tendency of variation in the amplitude ratio and the tendency of variation in the phase difference are determined according to the previously stored amount of variation in amplitude ratio ΔAtt and amount of variation in phase difference ΔPSD at each measurement point.

If the tendency of variation is that the amount of variation in amplitude ratio and the amount of variation in phase difference maintain a progressive increase from the third measurement point to the $n^{th}$ measurement point (i.e. the amount of variation in amplitude ratio and the amount of variation in phase difference at the $(m+1)^{th}$ measurement point are greater than the amount of variation in amplitude ratio and the amount of variation in phase difference at the $m^{th}$ measurement point, wherein m=1, 2, . . . , n−1), it is determined that a formation with low-resistivity appears in front of said apparatus for well logging.

Otherwise, if the tendency of variation is that the amount of variation in amplitude ratio and the amount of variation in phase difference maintain an approximatively progressive increase from the third measurement point to the $n^{th}$ measurement point, it is also determined that a formation with low-resistivity appears in front of said apparatus for well logging. As appreciated by those skilled in the art, the 'approximatively progressive increase' herein means that, although there are some ripples in the tendency of variation (in other words, the amount of variation in amplitude ratio and the amount of variation in phase difference at certain measurement point are smaller than the amount of variation in amplitude ratio and phase difference at the immediately previous measurement point), there are for example at least 70% of the measurement points to maintain the tendency of progressive increase. Said percentage also can be preset by those skilled in the art according to practice, and the percentage of 70% is only for illustrative rather than for restrictive.

Or else, if the tendency of variation does neither maintain a progressive increase, nor maintain an approximatively progressive increase, it is determined that no formation with low-resistivity appears in front of said apparatus for well logging.

According to another preferred embodiment of the present invention, during said process of deriving essential value in the step 1305, the formation resistivity, amplitude ratio and phase difference of the first and second selectable points of homogenous formation can be calculated by dyadic Green's function of magnetic dipole source with method of recursive matrix. For example, FIGS. 9-12 show several exemplary reference tables for eigenvalues of the resistivity, amplitude ratio and phase difference of various types of formations, and the corresponding physical quantities in said reference tables are calculated by dyadic Green's function of magnetic dipole source with method of recursive matrix.

It can be seen that FIG. 9 shows a reference table for eigenvalues of the resistivity, the amplitude ratio and the phase difference of various types of formations generated by the antenna system T2-R1-R2 of an apparatus for well logging according to a preferred embodiment of the invention at the frequency of 2 MHz. FIG. 10 shows a reference table for eigenvalues of the resistivity, the amplitude ratio and the phase difference of various types of formations generated by the antenna system T2-R1-R2 of an apparatus for well logging according to a preferred embodiment of the invention at the frequency of 400 kHz. FIG. 11 shows a reference table for eigenvalues of the resistivity, the amplitude ratio and the phase difference of various types of formations generated by the antenna system T1-R1-R2 of an apparatus for well logging according to a preferred embodiment of the invention at the frequency of 2 MHz. FIG. 12 shows a reference table for eigenvalues of the resistivity, the amplitude ratio and the phase difference of various types of formations generated by the antenna system T1-R1-R2 of an apparatus for well logging according to a preferred embodiment of the invention at the frequency of 400 kHz.

Furthermore, according to a further preferred embodiment of the present invention, said method for well logging further preferably comprises a step of calculating the distance from an axial forward formation with low-resistivity to the current measurement point of the apparatus for well logging additionally by using Sommerfeld integrals.

Figure 2:
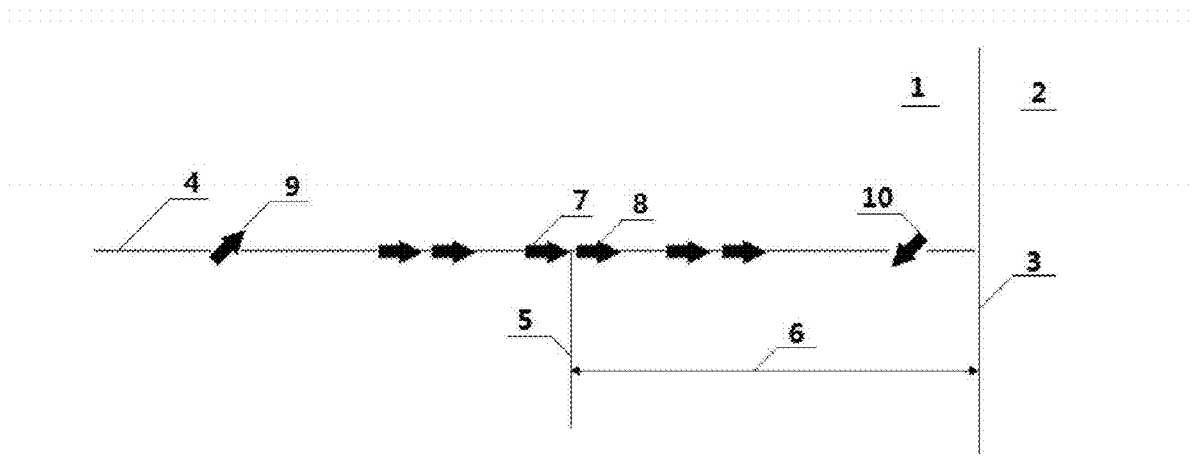
FIG. 2 shows a model diagram of a two-layered formation employed by a method for well logging according to the invention.

FIG. 2 illustrates a diagram showing a two-layered formation model used by the method and apparatus for well logging according to the present invention.

As shown in FIG. 2, the reference number of 1 represents a formation 1; the reference number of 2 represents another formation 2; the reference number of 3 represents a formation boundary between formation 1 and formation 2; the reference number of 4 represents a mandrel axis of the apparatus for electromagnetic wave propagation resistivity axial forward logging; the reference number of 5 represents a measurement point of the apparatus for electromagnetic wave propagation resistivity axial forward logging; the reference number of 6 represents the distance from the measurement point 5 to the formation boundary 3; the reference number of 7 represents a receiving antenna R1 at an installation angle of zero degree; the reference number of 8 represents a receiving antenna R2 preferably at an installation angle of zero degree; the reference number of 9 represents a receiving antenna R3 preferably at an installation angle of 45°; the reference number of 10 represents a receiving antenna R4 preferably at an installation angle of −45°; the reference number of 11 represents a transmitting antenna T1 preferably at an installation angle of zero degree.

According to said two-layered formation model, said apparatus for electromagnetic wave propagation resistivity axial forward logging is disposed in the formation 1 and is perpendicular to the formation boundary 3 between the formation 1 and the formation 2. The variations in the amplitude ratio and phase difference in formations having different resistivity contrasts may be obtained through varying the distance from the formation boundary 3 to the center point of the apparatus.

Figure 3:
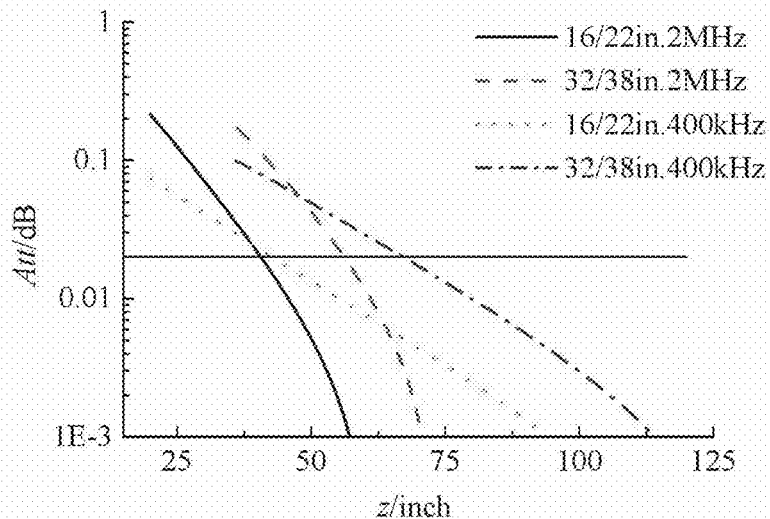
FIG. 3 illustrates a diagram showing a relationship where the amplitude ratio response of the formation with a resistivity contrast of 10/1 varies with the position of the formation boundary.
Figure 4:
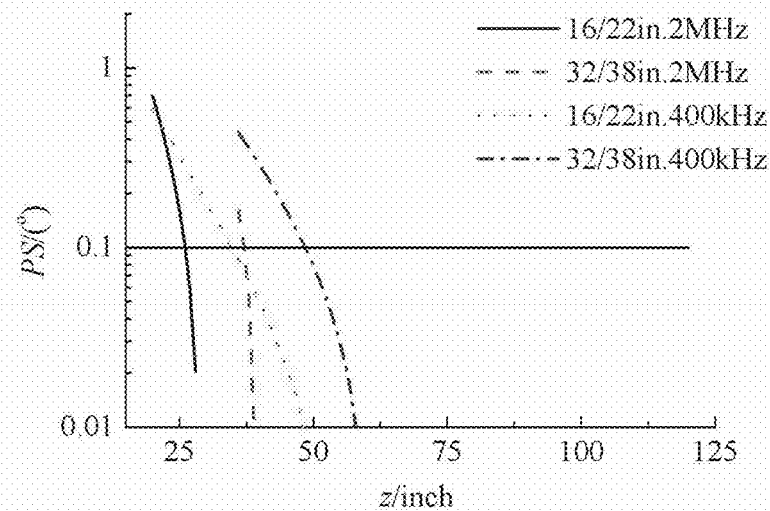
FIG. 4 illustrates a diagram showing a relationship where the phase difference response of a formation with a resistivity contrast of 10/1 varies with the position of the formation boundary.
Figure 5:
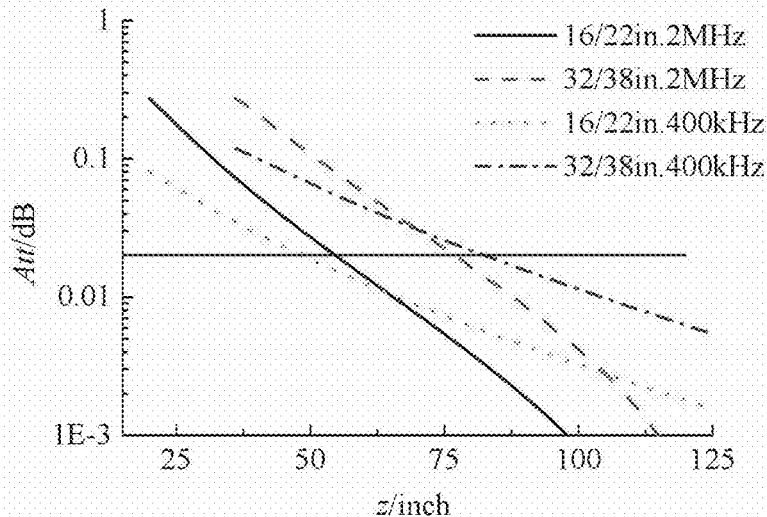
FIG. 5 illustrates a diagram showing a relationship where the amplitude ratio response of a formation with a resistivity contrast of 50/1 varies with the position of the formation boundary.
Figure 6:
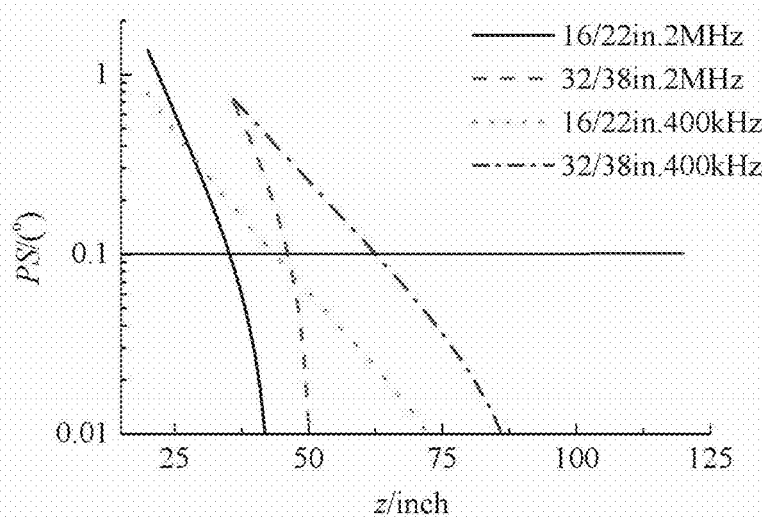
FIG. 6 illustrates a diagram showing a relationship where the phase difference response of a formation with a resistivity contrast of 50/1 varies with the position of the formation boundary.
Figure 7:
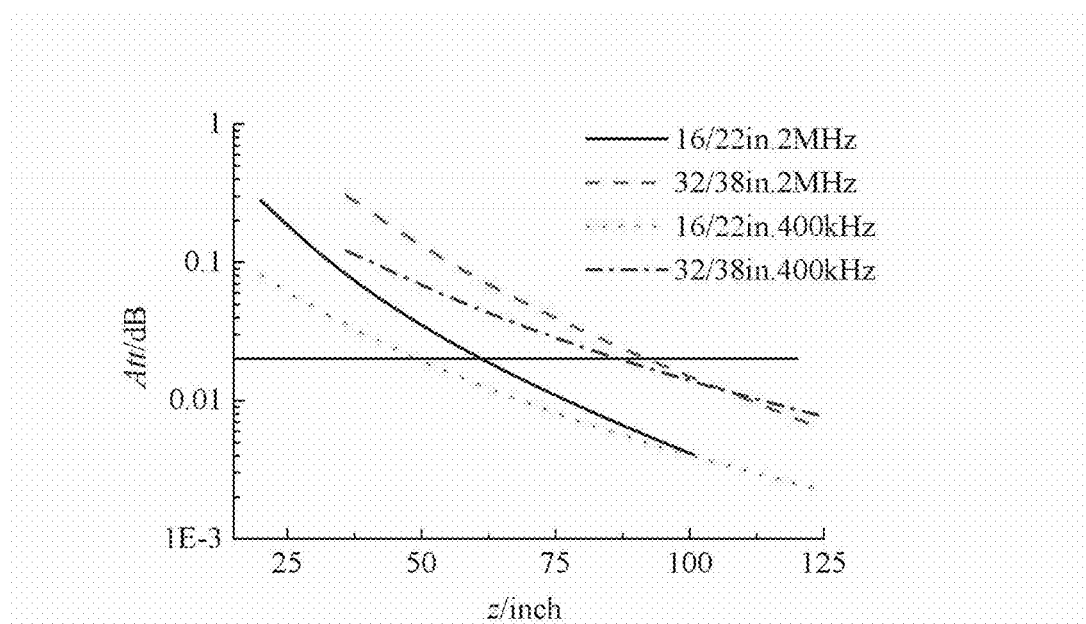
FIG. 7 illustrates a diagram showing a relationship where the amplitude ratio response of a formation with a resistivity contrast of 200/1 varies with the position of the formation boundary.
Figure 8:
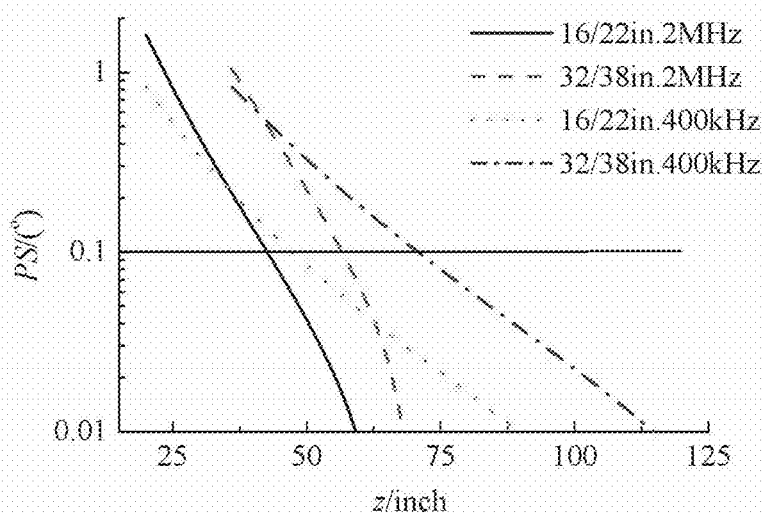
FIG. 8 illustrates a diagram showing a relationship where the phase difference response of a formation with a resistivity contrast of 200/1 varies with the position of the formation boundary.

FIG. 3 illustrates a diagram showing a relationship where the amplitude ratio response of the formation with a resistivity contrast of 10/1 varies with the position of the formation boundary. FIG. 4 illustrates a diagram showing a relationship where the phase difference response of a formation with a resistivity contrast of 10/1 varies with the position of the formation boundary. FIG. 5 illustrates a diagram showing a relationship where the amplitude ratio response of a formation with a resistivity contrast of 50/1 varies with the position of the formation boundary. FIG. 6 illustrates a diagram showing a relationship where the phase difference response of a formation with a resistivity contrast of 50/1 varies with the position of the formation boundary. FIG. 7 illustrates a diagram showing a relationship where the amplitude ratio response of a formation with a resistivity contrast of 200/1 varies with the position of the formation boundary. FIG. 8 illustrates a diagram showing a relationship where the phase difference response of a formation with a resistivity contrast of 200/1 varies with the position of the formation boundary.

In FIG. 3-FIG. 8, the x-axis represents the distance from the formation boundary 3 to the center point of the apparatus, and the y-axis represents the difference of the signal response generated by the antenna array disposed in the two-layered formation and in the homogenous formation with the resistivity of the formation 1.

Assuming that the threshold for amplitude ratio of the apparatus for electromagnetic wave propagation resistivity axial forward logging according to a preferred embodiment of the invention is 0.02 dB and the threshold for phase difference is 0.1° (as shown by the transverse line in FIG. 3-FIG. 8), it can be seen from FIG. 3-FIG. 8 the axial depth of investigation of respective pair of antennas of the apparatus for well logging disposed in various formations having different resistivity contrasts.

For example, in the formation having a resistivity contrast of 10/1, if the frequency of the pair of transmitting and receiving antenna is 2 MHz, the axial depth of investigation for the amplitude ratio and phase difference of the pair of antennas with 16/22 inch are 41 inch and 26 inch respectively, and the axial depth of investigation for the amplitude ratio and phase difference of the pair of antennas with 32/38 inch are 56 inch and 37 inch, respectively. If the frequency of the pair of transmitting and receiving antenna is 400 kHz, the axial depth of investigation for the amplitude ratio and phase difference of the pair of antennas with 16/22 inch are 43 inch and 35 inch respectively, and the axial depth of investigation for the amplitude ratio and phase difference of the pair of antenna with 32/38 inch are 67 inch and 48 inch, respectively.

In the formation having a resistivity contrast of 50/1, if said frequency is 2 MHz, the axial depth of investigation for the amplitude ratio and phase difference of the pair of antennas with 16/22 inch are 55 inch and 35 inch respectively, and the axial depth of investigation for the amplitude ratio and phase difference of the pair of antennas with 32/38 inch are 77 inch and 46 inch respectively. If said frequency is 400 kHz, the axial depth of investigation for the amplitude ratio and phase difference of the pair of antennas with 16/22 inch are 49 inch and 44 inch respectively, and the axial depth of investigation for the amplitude ratio and phase difference of the pair of antennas with 32/38 inch are 82 inch and 62 inch, respectively.

In the formation having a resistivity contrast of 200/1, if said frequency is 2 MHz, the axial depth of investigation for the amplitude ratio and phase difference of the pair of antennas with 16/22 inch are 61 inch and 43 inch respectively, and the axial depth of investigation for the amplitude ratio and phase difference of the pair of antennas with 32/38 inch are 92 inch and 57 inch respectively, if said frequency is 400 kHz, the axial depth of investigation for the amplitude ratio and phase difference of the pair of antennas with 16/22 inch are 50 inch and 47 inch respectively, and the axial depth of investigation for the amplitude ratio and phase difference of the pair of antennas with 32/38 inch are 87 inch and 71 inch, respectively.

It can be seen from FIG. 3 to FIG. 8 that, as the formation resistivity contrast increases, the variation in the amplitude ratio response or phase difference response compared with the variation in the position of the formation boundary is flatter. As the formation resistivity contrast or the distance between one transmitting antenna and one receiving antenna increases, the axial depth of investigation of said logging apparatus increases. In the formation having the same resistivity contrast, the axial depth of investigation of the amplitude ratio curve of the same one antenna pair is greater than the axial depth of investigation of the phase difference curve thereof.

During drilling forward by the drilling apparatus, the presence of a formation boundary or oil/water interface may be determined through measuring in real-time the variations in the amplitude ratio or phase difference by the apparatus for logging while drilling according to the present invention, whereby the drill tool can be controlled to pass through the best location of the petroleum reservoir. If the amplitude ratio and phase difference measured by the apparatus for logging while drilling do not vary during drilling forward by the drilling apparatus, it means that the readings of the amplitude ratio and phase difference generated by said apparatus for logging while drilling are substantially constant, it indicates that there does not exist a formation with low-resistivity in front of the apparatus for logging while drilling. If the readings of the amplitude ratio and phase difference are no longer a constant during drilling forward, it possibly indicates that a formation with low-resistivity appears in front of the drilling apparatus, and it is necessary to timely adjust the trajectory of the borehole to avoid drilling into the formation with low-resistivity. Consequently, the drilling apparatus can be always disposed in the oil-containing target formation with high-resistivity, thus can achieve the prediction of formation boundary before drilling and accurate geo-steering.

It will be appreciated by those skilled in the art that, although the present invention describes the preferred embodiment with respect to petroleum drilling, the apparatus and method for well logging according to the present invention are not limited to the technical field of petroleum drilling, and they can be further broadly adapted to coal mining, mining and other drilling industries.

Hereinafter, a data processing device for implementing the above discussed method for well logging according to a preferred embodiment of the invention will be set forth later in detail.

Figure 14:
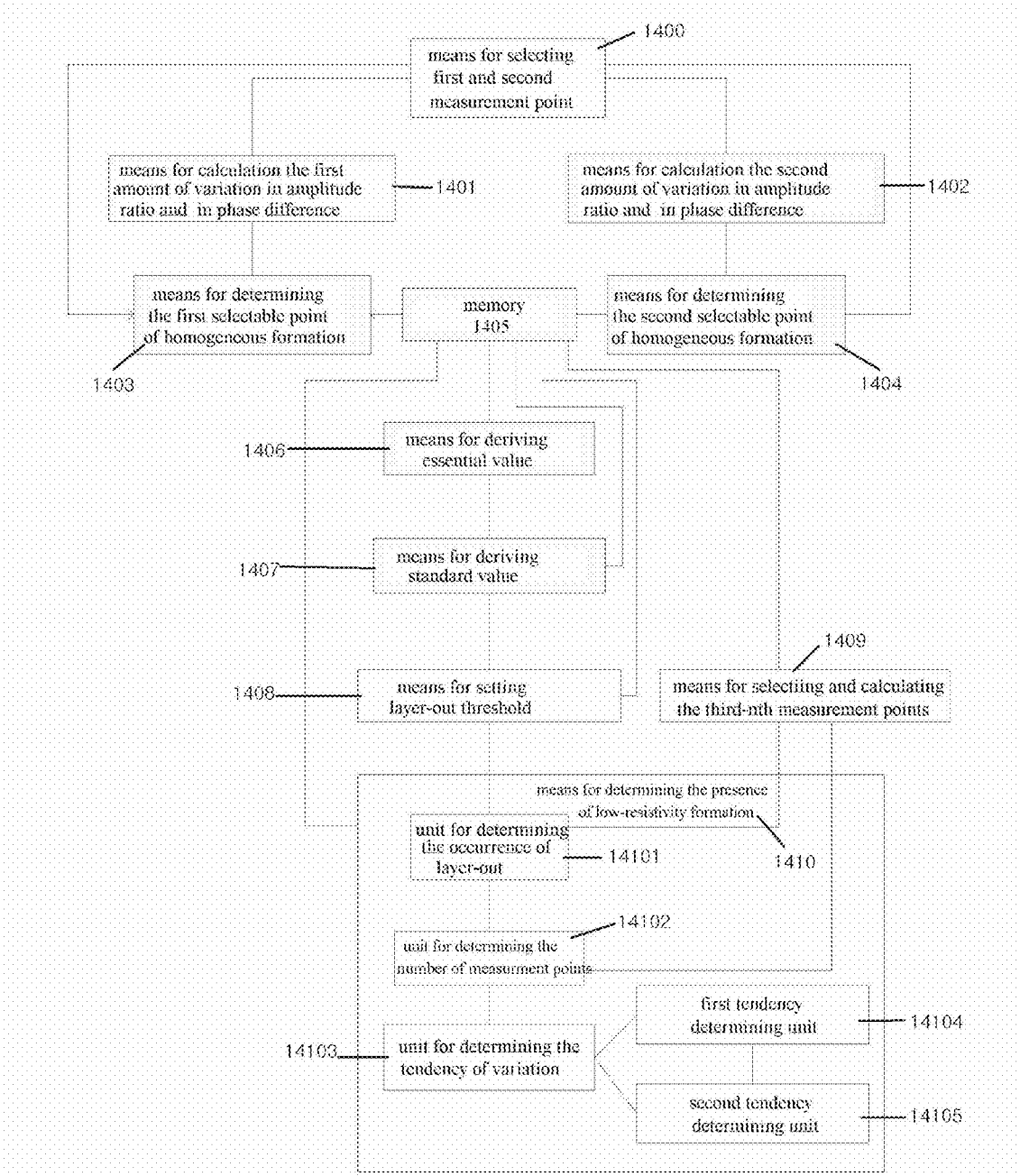
FIG. 14 shows a block diagram of a device for processing well-logging data according to a preferred embodiment of the invention.

As shown in FIG. 14, the data processing device according to the invention preferably comprises: means for selecting the first and second measurement points 1400, means for calculating the first amount of variation in amplitude ratio and in phase difference 1401, means for calculating the second amount of variation in amplitude ratio and in phase difference 1402, means for determining the first selectable point of homogeneous formation 1403, means for determining the second selectable point of homogeneous formation 1404, memory 1405, means for deriving essential value 1406, means for deriving standard value 1407, means for setting layer-out threshold 1408, means for selecting the third through $n^{th}$ measurement points and calculating the amount of variation in amplitude ratio and phase difference 1409, and means for determining the presence of a formation with low-resistivity 1410.

Wherein, said means for selecting the first and second measurement points 1400 selects two sequential measurement points (i.e. the first measurement point and the second measurement point), and instructs the apparatus for well logging to take at least two sequential measurements at each of the selected measurement points.

Said means for selecting the first and second measurement points 1400 is coupled to the means for calculating the first amount of variation in amplitude ratio and in phase difference 1401 and the means for calculating the second amount of variation in amplitude ratio and in phase difference 1402, respectively.

The means for calculating the first amount of variation in amplitude ratio and in phase difference 1401 is configured for calculating the amount of variation in amplitude ratio $\Delta Att$ and the amount of variation in phase difference $\Delta PSD$ of the induced electromotive force between the first receiving antenna and the second receiving antenna along the axial direction of the apparatus for well logging from the at least two sequential measurements at the first measurement point.

The means for calculating the second amount of variation in amplitude ratio and in phase difference 1402 is configured for calculating the amount of variation in amplitude ratio $\Delta Att$ and the amount of variation in phase difference $\Delta PSD$ of the induced electromotive force between the first receiving antenna and the second receiving antenna along the axial direction of the apparatus for well logging from the at least two sequential measurements at the second measurement point.

The means for determining the first selectable point of homogeneous formation 1403 is coupled to said means for calculating the first amount of variation in amplitude ratio and in phase difference 1401, and is configured for determining whether the first amount of variation in amplitude ratio $\Delta Att$ and the amount of variation in phase difference $\Delta PSD$ at the first measurement point are within their respective preset threshold range. If yes, the first measurement point is stored in the memory 1405 as the first selectable point of homogeneous formation. If not, the means for selecting the first and second measurement points 1400 is instructed to reselect another two measurement points. Preferably, the preset threshold range for the amount of variation in amplitude ratio may be set to 0-0.03 dB or other appropriate preset range as desired, and the preset threshold range for the amount of variation in phase difference may be set to 0°-0.1° or other appropriate preset range as desired.

The means for determining the second selectable point of homogeneous formation 1404 is coupled to said means for calculating the second amount of variation in amplitude ratio and in phase difference 1402, and is configured for determining whether the second amount of variation in amplitude ratio $\Delta Att$ and in phase difference $\Delta PSD$ at the second measurement point are within their respective preset threshold range. If yes, the second measurement point is stored in memory 1405 as the second selectable point of homogeneous formation. If not, the means for selecting the first and second measurement points 1400 is instructed to reselect another two measurement points.

The means for deriving essential values 1406 is coupled to the memory 1405, and is configured for determining the amplitude ratio essential value Att0 and phase difference essential value PSD0 of the signal response generated by the apparatus for well logging, which corresponds to the formation resistivity of the measured target formation with high-resistivity. According to a preferred embodiment, the means for deriving essential values 1406 takes the average value or mean square root of the multiple measurements of the amplitude ratio of the induced electromotive force between the first receiving antenna and the second receiving antenna measured at both of the first and second selectable points of homogeneous formation as the amplitude ratio essential value Att0. In a similar way, the means for deriving essential values 1406 takes the average value or mean square root of the multiple measurements of the phase difference measured at both of the first and second selectable points of homogeneous formation as the phase difference essential value PSD0.

Preferably, said means for deriving essential values 1406 may calculate the formation resistivity, amplitude ratio and phase difference at said first and second selectable points of homogenous formation by using dyadic Green's function of magnetic dipole source with method of recursive matrix. As appreciated by those skilled in the art, the means for deriving essential values 1406 also may calculate the formation resistivity, amplitude ratio and phase difference at said first and second selectable points of homogenous formation by using other prior function or algorithm.

The means for deriving standard values 1407 is coupled to said means for deriving essential values 1406 and memory 1405, and is configured for deriving and storing the standard value corresponding to the formation resistivity of the measured target formation with high-resistivity. According to a preferred embodiment, the means for deriving standard values 1407 is configured for comparing said amplitude ratio essential value Att0 and phase difference essential value PSD0 of the measured high-resistivity target formation with the corresponding predetermined eigenvalues of various types of formations. Then, the eigenvalues of the type of formation closest to said amplitude ratio essential value Att0 and phase difference essential value PSD0 can be selected as the amplitude ratio standard value and phase difference standard value corresponding to the formation resistivity of the measured high-resistivity target formation. The amplitude ratio standard value and phase difference standard value are stored in the memory 1405.

The means for setting layer-out threshold 1408 is coupled to the means for deriving standard values 1407 and memory 1405, and is configured for setting a layer-out threshold of the measured target formation with high-resistivity. According to a preferred embodiment, the means for setting layer-out threshold 1408 sets the layer-out threshold of said measured high-resistivity target formation according to the amplitude ratio standard value and phase difference standard value corresponding to the formation resistivity of said measured target formation. Thereafter, the layer-out threshold can be stored in said memory 1405.

Specifically, when the apparatus for well logging approaches a formation boundary with low-resistivity, the amplitude ratio and phase difference of the induced electromotive force between the first receiving antenna and the second receiving antenna in the axial direction of said apparatus for well logging will vary. The closer the apparatus for well logging approaches the boundary with low-resistivity, the larger the difference between said actually measured amplitude ratio as well as phase difference and the amplitude ratio standard value as well as the phase difference standard value are. When the amount of variation in the amplitude ratio and phase difference reaches or exceeds a preset value, it is normally deemed that a formation with low-resistivity appears in front of the apparatus for well logging. Said preset value is named as the layer-out threshold herein.

It is noted that the layer-out threshold for different measured formations may be set to different preset values by those skilled in the art according to the characteristics of the actually measured formations and measurement conditions. Generally, the layer-out threshold may be derived from the resistivity contrast between the two formations of the currently measured formation and the axial forward formation. Preferably, no matter how the resistivity contrast between the two formations of the currently measured formation and the axial forward formation is like, the layer-out threshold may be set to be 1%-30% of the amplitude ratio standard value or phase difference standard value. Further preferably, when said resistivity contrast is 1/10, the layer-out threshold may be preferably set to be 10% of said amplitude ratio standard value or phase difference standard value. The aforementioned manner of determining the layer-out threshold and the specific value of the layer-out threshold are for illustrative purpose only rather than for restrictive purpose, and those skilled in the art may select appropriate values in other ways according to practice.

The means for selecting the third through $n^{th}$ measurement points and calculating the amount of variation in amplitude ratio and phase difference 1409 is configured for proceeding to select a next measurement point, taking at least two measurements at the next measurement point, and calculating the amount of variation in amplitude ratio $\Delta$Att and the amount of variation in phase difference $\Delta$PSD of the induced electromotive force between the first receiving antenna and the second receiving antenna along the axial direction of the apparatus for well logging at such a measurement point.

The means for determining the presence of the formation with low-resistivity 1410 is coupled to the memory 1405, the means for setting layer-out threshold 1408, and the means for selecting the third through $n^{th}$ measurement points and calculating the amount of variation in amplitude ratio and phase difference 1409.

According to the preferred embodiment, the means for determining the presence of the formation with low-resistivity 1410 comprises a unit for determining the occurrence of layer-out 14101, which is configured for deciding whether the amount of variation in amplitude ratio $\Delta$Att and the amount of variation in phase difference $\Delta$PSD at the current measurement point calculated by said means for selecting the third through $n^{th}$ measurement points and calculating the amount of variation in amplitude ratio and phase difference 1409 are greater than the layer-out threshold. If yes, it is determined that there is a low-resistivity formation in front of the apparatus for well logging; If not, the amount of variation in amplitude ratio $\Delta$Att and the amount of variation in phase difference $\Delta$PSD at the current measurement point are stored in the memory 1405.

According to another preferred embodiment, the means for determining the presence of the formation with low-resistivity 1410 further comprises a unit 14102 for determining the number of measurement points as well as a unit 14103 for determining the tendency of variation in amplitude ratio and phase difference.

The unit for determining the number of measurement points 14102 is configured for determining whether the currently selected measurement point is the preset $n^{th}$ measurement point when the unit for determining the occurrence of layer-out 14101 determines that the amount of variation in amplitude ratio $\Delta$Att and the amount of variation in phase difference $\Delta$PSD at the current measurement point are not greater than the layer-out threshold. If not, the means for selecting the third through $n^{th}$ measurement points and calculating the amount of variation in amplitude ratio and phase difference 1409 is instructed to proceed to select a next measurement point and to calculate the amount of variation in amplitude ratio $\Delta$Att and the amount of variation in phase difference $\Delta$PSD; or else if the currently selected measurement point is the preset $n^{th}$ measurement point, the unit for determining the tendency of variation in amplitude ratio and phase difference 14103 is instructed to determine the tendency of variation in amplitude ratio and the tendency of variation in phase difference according to the previously stored amount of variation in amplitude ratio $\Delta$Att and the amount of variation in phase difference $\Delta$PSD at each measurement point (i.e. the third, fourth, fifth, . . . , $n^{th}$ measurement point).

As discussed before, said number 'n' is preset by those skilled in the art based on the characteristics of the measured formation and the measuring speed. For example, if the measured formation is a softer formation (e.g. sand rocks in a coastal area), n can be relatively smaller, while if the measured formation is a harder formation (e.g. shale rocks), n can be relatively larger. Typically, for a general formation, n may be preferably preset to be 20-30, but the invention never to be limited to such a range of value, and other appropriate values may be preset for n.

According to a yet further embodiment, the means for determining the presence of the formation with low-resistivity 1410 further comprises a first tendency determining unit 14104 which is configured for determining whether the tendency of variation determined by said unit 14103 is that the amount of variation in amplitude ratio and the amount of variation in phase difference maintain a progressive increase from the third measurement point to the $n^{th}$ measurement point (i.e. the amount of variation in amplitude ratio and the amount of variation in phase difference at the $(m+1)^{th}$ measurement point are greater than the amount of variation in amplitude ratio and the amount of variation in phase difference at the $m^{th}$ measurement point, wherein m=1, 2, . . . , n−1); If yes, it is determined that a formation with low-resistivity appears in front of said apparatus for well logging.

According to another further embodiment, the means for determining the presence of the formation with low-resistivity 1410 further comprises a second tendency determining unit 14105 which is configured for determining whether the tendency of variation maintain an approximately progressive increase from the third measurement point to the $n^{th}$ measurement point in the case of the determination of the first tendency determining unit 14104 being negative. If the tendency of variation does maintain an approximately progressive increase, it is also determined that a formation with low-resistivity is in front of said apparatus for well logging; or else if the tendency does not maintain an approximately progressive increase, it is determined that no formation with low-resistivity appears in front of said apparatus for well logging.

As mentioned above, the 'approximatively progressive increase' herein means that, although there are some ripples in the tendency of variation (in other words, the amount of variation in amplitude ratio and the amount of variation in phase difference at certain measurement point are smaller than the amount of variation in amplitude ratio and phase difference at the immediately previous measurement point), there are for example at least 70% of the measurement points to maintain the tendency of progressive increase. Said percentage also can be preset by those skilled in the art according to practice, and the percentage of 70% is only for illustrative rather than for restrictive.

Please note that the preferred embodiments of the invention may be implemented in any one of or the combination of hardware, software, firmware. In the various embodiment(s), the device components are implemented by software or firmware stored in the memory and executed by an appropriate instruction execution system. If it is implemented in hardware, for example in some embodiments, the device components may be implemented by any one of or the combination of the following techniques well-known by those skilled in the art: discrete logic circuit(s) having a logic gate for performing logic function on data signals, an application-specific integrated circuit (ASIC) comprising an appropriate combinational logic gate, programmable gate array(s) (PGA), a field-programmable gate array (FPGA) and so on.

Software components may include an ordered list of the executable instructions for performing logic function, which may be embodied in any computer readable medium to be used by or in connection with an instruction execution system, apparatus or device. Said instruction execution system, apparatus or device is, for example, a computer-based system, a system containing a processor, or other system that can obtain instructions from the instruction execution system, apparatus or device and can execute said instructions. Besides, the scope of the present disclosure includes a function of embodying one or more embodiments in the logic embodied in the medium composed of hardware or software.

The embodiments of the present disclosure have been disclosed for the purpose of illustration. They do not intend to be exhaustive or restrict the present disclosure to the disclosed precise forms. According to the disclosure above, many variations and modifications of the embodiments herein are apparent for those skilled in the art. It is noted that the above examples do not intend to be restrictive. Additional embodiments of apparatuses, methods and devices comprising many of the aforesaid features may be further anticipated. The other apparatuses, methods, devices, features and advantages of the present disclosure are even more apparent to those skilled in the art after making reference to the detailed description and accompany figures. It is intended that all of such other apparatuses, methods, devices, features and advantages are included in the protection scope of the invention.

Unless specified otherwise, conditional languages such as "be able to", "can", "possibly", "may" and the like generally intend to indicate that some embodiments may but not necessarily comprise some features, elements and/or steps. Therefore, such conditional languages generally do not intend to give a hint for requiring that one or more embodiments have to comprise features, elements and/or steps.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

The invention claimed is:

1. An apparatus for well logging, wherein said apparatus for well logging comprises a drill collar body and an array of antennas,
   wherein said array of antennas comprises four transmitting antennas T1, T2, T3 and T4, and four receiving antennas R1, R2, R3 and R4;
   the array of antennas is installed from a drill-collar-tail to a drill-head of the drill collar body in the following order: the receiving antenna R3, the transmitting antenna T3, the transmitting antenna T1, the receiving antenna R1, the receiving antenna R2, the transmitting antenna T2, the transmitting antenna T4, and the receiving antenna R4; a middle point between said receiving antennas R1 and R2 is a measurement point, said transmitting antennas T1 and T2 are installed symmetrically about the measurement point, and said transmitting antennas T3 and T4 are installed symmetrically about said measurement point;
   wherein installation angles of said receiving antennas R3 and R4 are respectively set to be 45° and −45° relative to an axis of the drill-collar body; and
   wherein any combination of any one of the transmitting antennas with any pair of receiving antennas in the apparatus for well logging may generate a curve of axial forward investigation.

2. The apparatus according to claim 1, wherein
   said receiving antennas R1 and R2 each have an installation angle of substantially zero relative to the axis of the drill-collar body; and
   said receiving antennas R3 and R4 are positioned on both ends of the drill collar body and are symmetrical about said measurement point.

3. The apparatus according to claim 1, wherein a plurality of grooves are carved on an exterior surface of the drill collar body.

4. The apparatus according to claim 3, wherein the plurality of grooves are circle-shaped or ellipse-shaped, and wherein said grooves are used for installation of the transmitting antennas or receiving antennas.

5. The apparatus according to claim 1, wherein the apparatus is operated in a frequency range between 400 kHz and 2 MHz.

6. The apparatus according to claim 5, wherein the apparatus is operated at a frequency of 400 kHz or 2 MHz.

7. The apparatus according to claim 1, wherein the apparatus is used for electromagnetic wave propagation resistivity axial forward logging.

8. The apparatus according to claim 2, wherein the apparatus is used for electromagnetic wave propagation resistivity axial forward logging.

9. The apparatus according to claim 3, wherein the apparatus is used for electromagnetic wave propagation resistivity axial forward logging.

10. The apparatus according to claim 4, wherein the apparatus is used for electromagnetic wave propagation resistivity axial forward logging.

11. The apparatus according to claim 5, wherein the apparatus is used for electromagnetic wave propagation resistivity axial forward logging.

12. The apparatus according to claim 6, wherein the apparatus is used for electromagnetic wave propagation resistivity axial forward logging.

* * * * *